United States Patent [19]
von Wimmersperg

[11] 4,113,306
[45] Sep. 12, 1978

[54] CONVERTIBLE CHILD RESTRAINT

[76] Inventor: Heinrich F. von Wimmersperg, 15721 Rosemont Rd., Detroit, Mich. 48223

[21] Appl. No.: 786,078

[22] Filed: Apr. 11, 1977

Related U.S. Application Data

[63] Continuation-in-part of Ser. No. 635,653, Nov. 26, 1975, Pat. No. 4,067,608.

[51] Int. Cl.² .............................................. B60R 21/10
[52] U.S. Cl. .................................... 297/216; 297/250; 297/377
[58] Field of Search ............... 297/216, 130, 384, 377, 297/250, 118; 280/47.37 R, 30, 31

[56] References Cited
U.S. PATENT DOCUMENTS

| | | |
|---|---|---|
| 2,435,733 | 2/1948 | Belyeu .............................. 280/30 |
| 2,758,847 | 8/1956 | Shone ........................ 280/47.37 R |
| 3,436,770 | 4/1969 | Turner ......................... 297/254 UX |
| 3,463,504 | 8/1969 | Petry et al. ........................ 280/31 |
| 3,492,047 | 1/1970 | Dudouyt ............................ 297/377 |
| 3,549,164 | 12/1970 | Raynor .............................. 280/30 |
| 3,659,865 | 5/1972 | Nothacker .......................... 280/31 |
| 3,970,325 | 7/1976 | Wirsig ............................. 297/377 |
| 3,976,328 | 8/1976 | Stahel ............................. 297/377 |

FOREIGN PATENT DOCUMENTS 2,205,859 8/1972 Fed. Rep. of Germany ........... 297/384

*Primary Examiner*—James T. McCall
*Attorney, Agent, or Firm*—Barnes, Kisselle, Raisch & Choate

[57] ABSTRACT

A device adapted to be used as either a safety restraint seat for a child in a vehicle or as a stroller. The device comprises a shell provided with wheels and with a handle adjustable to a first position extending upwardly and rearwardly for using the device as a stroller and to a second position extending downwardly below the shell for engaging a vehicle floor structure when the shell is placed on a vehicle seat in a rearwardly-facing position.

7 Claims, 12 Drawing Figures

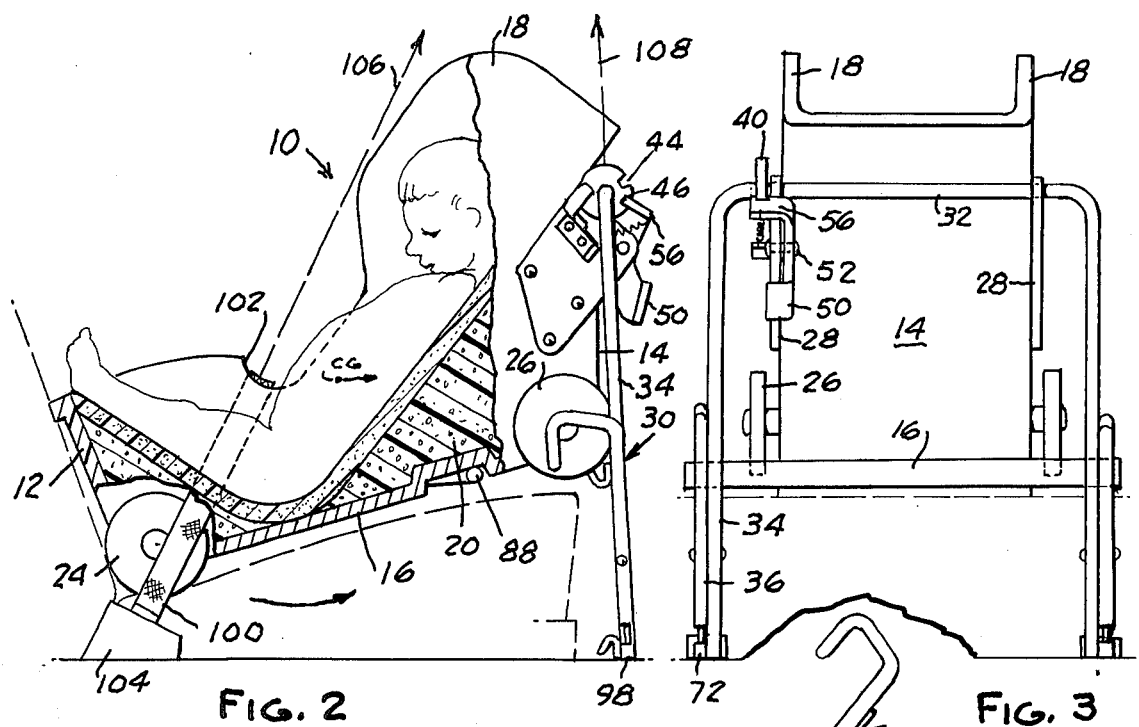
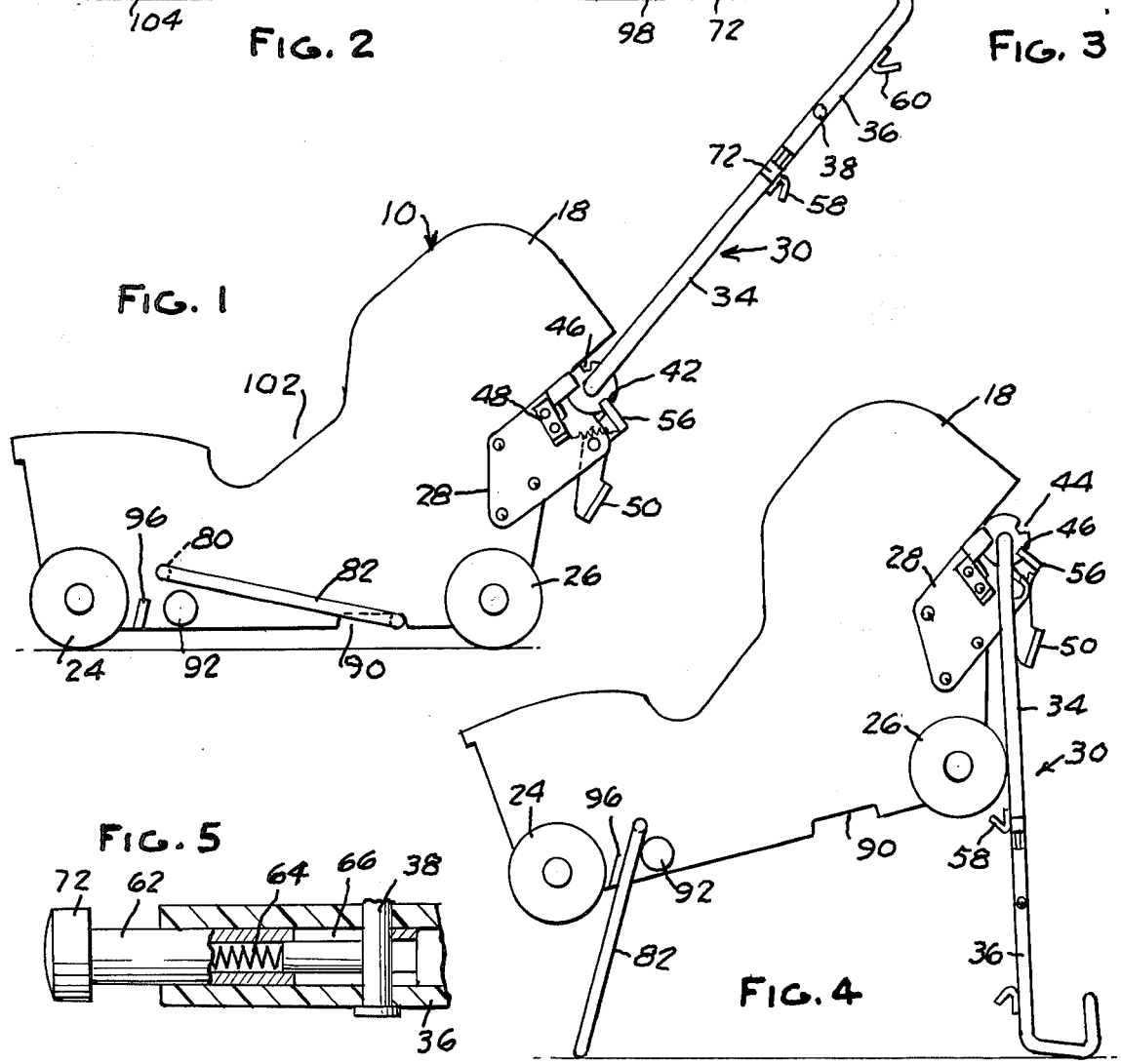

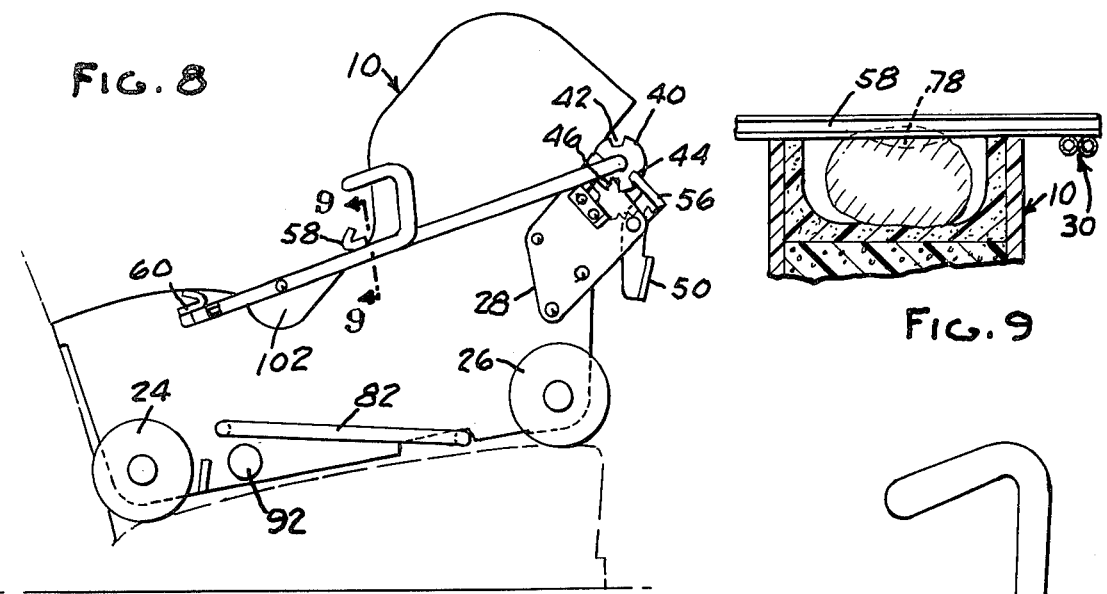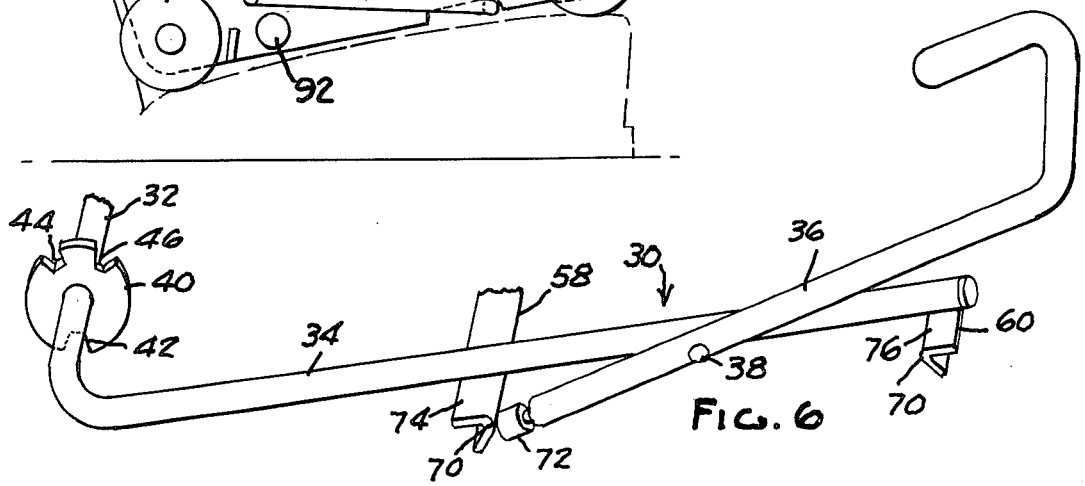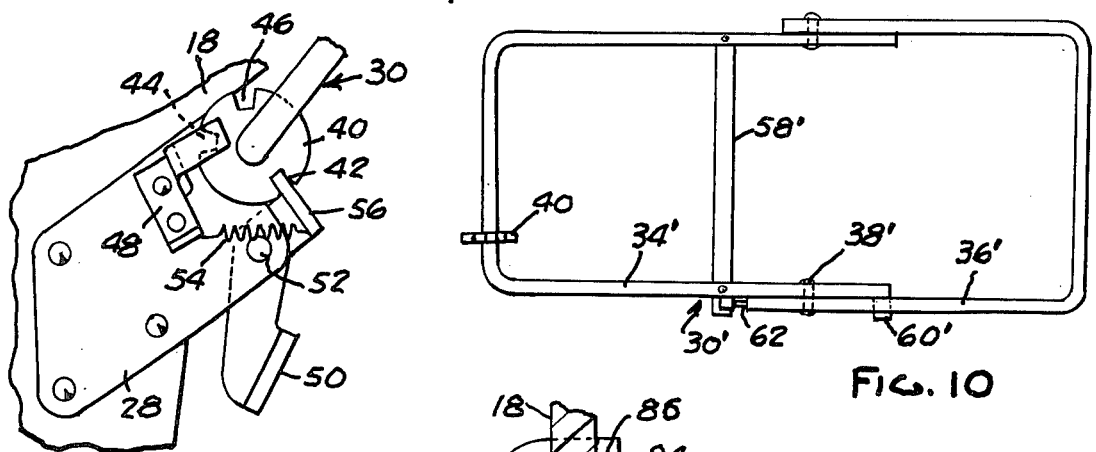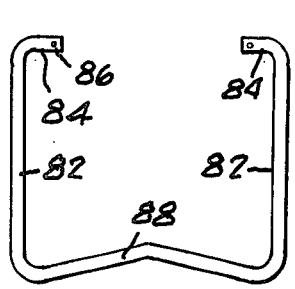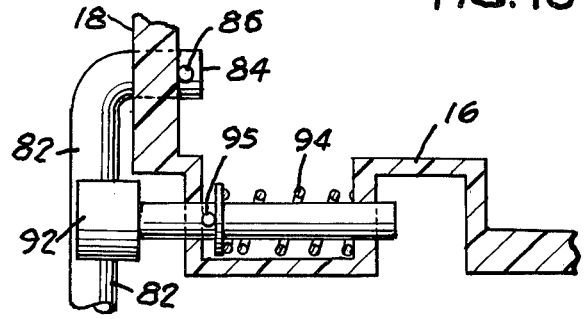

CONVERTIBLE CHILD RESTRAINT

This application is a continuation-in-part of my prior copending application Ser. No. 635,653, filed Nov. 26, 1975, now U.S. Pat. No. 4,067,608.

This invention relates to a child's stroller and, more particularly, to a stroller adapted to be readily converted to a child's safety restraint seat for use in a vehicle or to a child's highchair.

Heretofore it has been known to mount a child's vehicle safety restraint device on a carriage for use as a stroller. Likewise, it is not new to attach wheels and a handle to a shell of a child's vehicle restraining device so that it can be used as a stroller. However, with both types of constructions heretofore proposed it is necessary to remove certain elements from the shell when it is desired to use the shell as a child restraining device in a vehicle. Thus, in constructions heretofore proposed it is necessary to dismantle from the shell and to store such parts as a handle, an undercarriage, wheels, etc. when the device is used as a child's restraining seat in a vehicle.

The primary object of the present invention is to provide a stroller of integral construction which can be converted into a safety restraint for use in a vehicle without requiring the removal of any parts. The accomplishment of this object is important not only from the standpoint of practicality, but also because the unit can be manufactured, shipped and merchandised more economically than the constructions heretofore proposed.

More specifically, the invention comprises an enclosure for the child in the form of a shape-retaining shell having wheels mounted thereon and also a handle shiftable to various positions, depending upon the use to which the device is to be put.

Another feature of the stroller of this invention resides in the design of the handle which prevents it from being incorrectly arranged when a stroller is used as a safety restraint device in a vehicle.

The stroller of this invention is designed such that by the manipulation of a minimum number of parts it can be used for travelling on a ground surface, a safety restraining seat in a vehicle, or as a child's highchair.

More specifically, the stroller is designed so that it can be converted from one use to another without removing the child therefrom.

Other objects, features and advantages of the present invention will become apparent from the following description and accompanying drawings, in which:

FIG. 1 is a side elevational view of the stroller arranged for travelling on a ground surface;

FIG. 2 shows a side elevational view, partly in section, of the stroller when arranged as a child's safety restraining seat in a vehicle;

FIG. 3 is a view of the arrangement shown in FIG. 2 as seen from the front side of the seat;

FIG. 4 illustrates the seat arranged as a highchair;

FIG. 5 is a fragmentary sectional view of the arrangement for locking the handle either in the extended or in the collapsed position;

FIG. 6 is a fragmentary perspective view of the handle showing the manner in which it may be collapsed;

FIG. 7 is a fragmentary view of the handle locking arrangement;

FIG. 8 is a side elevational view of the stroller positioned on a vehicle seat and with the handle improperly arranged for use as a safety restraint device;

FIG. 9 is a sectional view along the line 9—9 in FIG. 8;

FIG. 10 is a plan view of a modified form of handle;

FIG. 11 is an elevational view of the front leg which may be optionally mounted on the device; and FIG. 12 is a fragmentary sectional view of the arrangement for locking the leg shown in FIG. 11 in either of its desired positions.

Referring to FIGS. 1 and 2, the stroller of the invention comprises a shell 10 which is preferably molded of at least a semi-rigid plastic material having a front wall 12, a rear wall 14, a bottom wall 16 and side walls 18. Within shell 10 there is arranged an insert 20 formed of a compressible, slow-recovery foam which is overlaid with a soft, slow-recovery padding 22. Front and rear wheels 24, 26, respectively, are mounted on shell 10 adjacent the opposite ends thereof. Insert 20 is shaped such that, when the shell is oriented in a generally horizontal position as shown in either FIG. 1 or FIG. 2, the child is supported therein in a generally upright, inclined position.

Adjacent the rear of each side wall 18 there is mounted thereon a rigid journal plate 28 on which a handle 30 is pivotably supported. Handle 30 is of generally U-shaped configuration with a cross bar 32 interconnecting the pivotably supported legs of the handle. The handle legs each comprise two sections 34, 36 which are pivotably interconnected as at 38. At one end of cross bar 32 there is fixedly secured thereto a disc 40 having three circumferentially spaced notches 42, 44, 46 around the periphery thereof. Disc 40 is located axially between journal plate 28 and a retainer plate 48 mounted thereon. The handle 30 is adapted to be retained in any of the hereinafter described positions by means of a lock latch 50 pivotably mounted on the adjacent plate 28 as at 52 and biased to a latching position by a spring 54. The sear 56 of lock latch 50 is adapted to engage in any of the notches 42, 44, 46 to lock handle 30 in a plurality of different positions. For example, as shown in FIG. 1, when sear 56 engages in notch 42 handle 30 is locked in a position extending upwardly and rearwardly from shell 10. When sear 56 engages with notch 44 handle 30 is locked in a generally upright position extending downwardly from the shell. Likewise, when sear 56 engages in notch 46 handle 30 is locked in a forwardly extending position overlying the shell. If desired, a lock latch and disc may be provided adjacent both ends of cross bar 32.

The sections 34 of handle 30 are interconnected by additional cross bar 58 which projects laterally outwardly beyond the handle sections. The outer ends of handle sections 34 are provided with laterally outwardly extending lugs 60. The inner ends of sections 36 of handle 30 are of tubular shape and slideably receive plungers 62 which are biased axially outwardly by compression springs 64. Each plunger 62 is slotted as at 66 to receive the pivot shaft as at 38. Thus, plungers 62 are axially retractable and extendable within the handle sections 36. The handle sections 36 are located on the laterally outer sides of handle sections 34 and the outer ends of cross bar 68 and lugs 60 are formed with cam surfaces as at 70 adapted to be engaged by the ends 72 of plungers 62. Thus, when handle sections 36 are pivoted in the direction of the arrow in FIG. 6, the ends 72 of the plungers engage and ride over the cam surfaces 70 and onto the flat surfaces 74 of the ends of cross bar 58 to lock the handle in its extended position. In this position the upper end portion of each handle section 36 is locked against the flat upper face 76 of lugs 60. When handle section 36 is rotated in the opposite direction the ends 72 of plungers 62 ride over the cam surface 70 of lug 60 and lock the handle in the collapsed condition shown in FIG. 8.

It will be observed that, when the handle is swung forwardly to the position shown in FIG. 8 wherein the two handle sections are in the collapsed condition, cross bar 58 is located in a position interfering with the abdomen of a child supported within shell 10. As shown in FIG. 9, if it is desired to exaggerate this interference the central portion of cross bar 58 may have an additional humped member 78 mounted thereon and arranged to project within the confines of the shell to provide very substantial interference with a child therein.

In the arrangement shown in FIG. 10 a modified handle 30' is shown wherein two sections 34', 36' are both of U-shape and interconnected by pins 38'. In this arrangement a single plunger 62 may be employed. In other respects handle 30' is substantially the same as handle 30.

In addition to handle 30 there is pivotably mounted on shell 10 as at 80 a generally U-shaped support leg 82. The pivotal supports 80 comprise openings located one on each side panel 18 adjacent the lower forward ends thereof. The inwardly bent ends 84 of leg 82 project into the openings 80 and are retained therein by pins 86. Leg 82 is adapted to be swung between the collapsed position shown in FIG. 1 wherein the bight portion 88 of the leg is nested within a recess 90 on the bottom of the shell to an upright supporting position (shown in FIG. 4) wherein the free end of the leg is adapted to engage a ground surface. Leg 82 is adapted to be retained in the nested position by a plunger 92 mounted in the bottom wall 16 of the shell and biased axially outwardly by a compression spring 94 engaging a pin 95 on plunger 92 so that the head of the plunger normally lies in the path of swinging movement of the leg. In the upright position shown in FIG. 4 the leg is trapped between plunger 92 and a stop 96 on side wall 18.

When the device is used as a stroller, leg 82 is arranged in the nested position and handle sections 34, 36 are extended as shown in FIG. 1. The handle 30 is locked in the upwardly and rearwardly inclined position by engaging the sear 56 of lock latch 50 with notch 42 in locking disc 40. In this condition of the device a child may be placed therein and the shell rolled along a ground surface.

If it is desired to use the device as a child's safety restraint in a vehicle, spring plunger 62 is retracted and handle section 36 is pivoted counterclockwise as viewed in FIG. 1 to snap the head 72 of the spring plunger over lug 60. Thereafter, the handle assembly is pivoted downwardly and the sear 56 of lock latch 50 is interengaged with notch 44 of disc 40 so that the handle assembly assumes the position shown in FIG. 2. It will be appreciated that the handle can be so collapsed and arranged without removing the child from within the shell. Thereafter the device is arranged on a vehicle seat in the manner shown in FIG. 2 with the shell and the child in a rearwardly facing direction.

In the position shown in FIG. 2 the collapsed handle will project downwardly forwardly of the front edge of the vehicle seat and the lower end thereof will engage the floor structure 98 of the vehicle. With the shell so arranged on the vehicle seat the conventional vehicle seat restraining belt 100 is tightened around the shell. The upper edges of side walls 18 have a recess 102 formed therein for engaging and retaining said belt in the desired position; namely, inclined forwardly and upwardly from the anchoring plates 104 on the floor structure of the vehicle and around the shell at the recesses 102. It will be noted that, when the device is arranged as shown in FIG. 2, the line of force 106 of seat belt 100 and the line of force 108 between handle 30 and shell 10 are inclined toward each other and intersect above the center of gravity CG of the device with the child placed therein. Accordingly, in the event of a front end collision the inertia forces of the combined mass of the child and the device tend to pivot the shell counterclockwise as indicated by the arrow in FIG. 2. This results from the fact that handle 30 forms a rigid strut between the floor structure of the vehicle and its point of pivotal connection with the shell. This may cause the front wheels 24 on the shell to be displaced further into the vehicle seat. However, it will not result in the application of forces on the child which would tend to produce serious injury. The danger of ejection of the child is greatly reduced without the necessity of providing shoulder straps around the child to restrain the inertia forces imposed on the child. Shoulder straps, if provided, would only be used to prevent ejection of the child in the event of a collision wherein the vehicle might roll over. Accordingly, the provision of such shoulder straps is not illustrated in the drawings. When the device is arranged in the manner illustrated in FIG. 2 it functions in the same manner as shown in my co-pending application Ser. No. 635,653, filed Nov. 26, 1975.

When it is desired to remove the child and the device from within a vehicle it is only necessary to detach the seat belt 100 and thereafter pivot handle 30 to a desired position. In the event it is desired to use the device as a highchair, it is only necessary to pivot handle section 36 to the extended position while the handle is locked as shown in FIG. 2 and to swing leg 82 to the position shown in FIG. 4.

It will be observed that recess 102 not only provides a means for properly locating seat belt 100, but also provides a recess in each side wall of the shell above the plane of which the child's body would normally project. Thus, although for storage purposes the handle 30 can be pivoted forwardly to the position shown in FIG. 8 wherein the sear 56 of lock latch 50 engages notch 44, it is apparent that the user will appreciate that the handle is improperly located in this position when it is desired to use the device as a child's restraint in a vehicle. The cross bar 58 or the humped portion 78 thereon would seriously interfere with the child's body. Thus, the user would realize that the proper location of the handle when the device is used as a child's restraint is in the upright position shown in FIG. 2 rather than in the collapsed position shown in FIG. 8.

I claim:

1. A device convertible from a child's stroller to a safety restraint seat for use in a vehicle comprising, a shell in which the child is adapted to be placed in a generally inclined upright position; ground-engaging wheels mounted on the shell adjacent the front and rear ends thereof; a handle mounted adjacent the rear end of the shell and adjustable to a first position where it extends upwardly and rearwardly from the shell to enable use of the device as a child's stroller and to a second position where it extends downwardly from the shell to a level substantially below the plane of said wheels and means for locking the handle in either of said two positions relative to the shell whereby, when the device with the handle locked in said downwardly extending position is placed on a vehicle seat in a rearwardly facing direction, the free end of the handle projects downwardly forwardly of the front edge of the vehicle seat cushion and engages the vehicle floor structure to support the shell such that the child therein is positioned in a rearwardly facing upwardly inclined position, means on said shell for interengaging the shell with a conventional vehicle seat belt associated with the vehicle seat so that the belt, when tightened around the shell, inclines upwardly in a forwardly direction, and rigid journal members on each side of said shell, said handle being pivotably mounted on said journal members for swinging movement between said first and second positions, said handle comprising a pair of generally parallel legs interconnected by a cross bar, said legs each comprising a pair of pivotably connected sections, said sections being swingable from an extended position to an overlapping nested position for shortening the effective length of the handle.

2. A device convertible from a child's stroller to a safety restraint seat for use in a vehicle comprising a shell in which the child is adapted to be placed in a generally inclined upright position; ground-engaging wheels mounted on the shell adjacent the front and rear ends thereof; a handle mounted adjacent the rear end of the shell and adjustable to a first position where it extends upwardly and rearwardly from the shell to enable use of the device as a child's stroller and to a second position where it extends downwardly from the shell to a level substantially below the plane of said wheels and means for locking the handle in either of said two positions relative to the shell whereby, when the device with the handle locked in said downwardly extending position is placed on a vehicle seat in a rearwardly facing direction, the free end of the handle projects downwardly forwardly of the front edge of the vehicle seat cushion and engages the vehicle floor structure to support the shell such that the child therein is positioned in a rearwardly facing upwardly inclined position, means on said shell for interengaging the shell with a conventional vehicle seat belt associated with the vehicle seat so that the belt, when tightened around the shell, inclines upwardly in a forwardly direction, said means for interengaging the shell with the seat belt being located on the shell so that, when the device is positioned on the vehicle seat as described, the plane extending through the anchoring points of said belt on the vehicle and the connection points between the seat belt and the shell intersects the plane extending through the lower end of the handle and its pivotal connection with the shell at an axis disposed horizontally above the center of gravity of the device with the child positioned therein.

3. A device convertible from a child's stroller to a safety restraint seat for use in a vehicle comprising a shell in which the child is adapted to be placed in a generally inclined upright position; ground-engaging wheels mounted on the shell adjacent the front and rear ends thereof; a handle pivotably mounted adjacent the rear end of said shell and pivotable to a first position where it extends upwardly and rearwardly from the shell to enable use of the device as a child's stroller and to a second position where it extends downwardly from the shell to a level substantially below the plane of said wheels and means for locking the handle in either of said two positions relative to the shell whereby, when the device with the handle locked in said downwardly extending position is placed on a vehicle seat in a rearwardly facing direction, the free end of the handle projects downwardly forwardly of the front edge of the vehicle seat cushion and engages the vehicle floor structure to support the shell such that the child therein is positioned in a rearwardly facing upwardly inclined position, means on said shell for interengaging the shell with a conventional vehicle seat belt associated with the vehicle seat so that the belt, when tightened around the shell, inclines upwardly in a forwardly direction, said handle being pivotable in a forwardly direction to a third position wherein it overlies said shell, said handle being shaped so that at least a portion thereof interferes with a child positioned within the shell when the handle is pivoted to said overlying position.

4. A device as called for in claim 3 wherein said handle comprises a pair of generally parallel legs interconnected by a cross bar, said cross bar being located on said legs such that, when the handle is pivoted to said overlying position, the cross bar interferes with a child located in said shell.

5. A device as called for in claim 1 wherein said handle is pivotable in a forwardly direction to overlie said shell in said nested position.

6. A device as called for in claim 5 wherein said handle is shaped so that at least a portion thereof interferes with a child positioned within the shell when the handle is pivoted to said overlying position in the nested condition.

7. A device as called for in claim 6 wherein said shell has a pair of side walls for confining the child laterally therein, said means for interengaging the seat belt with the shell comprising a recess in the upper edge of each side wall, said recesses extending downwardly toward the bottom of the shell to a level below the adjacent portions of the child's body positioned therein, said handle having a cross bar adapted to extend within said recesses when the handle is pivoted to said overlying position such that the cross bar interferes with the child located in the shell.

* * * * *